(12) United States Patent
Tanaka (10) Patent No.: US 7,054,544 B1
(45) Date of Patent: May 30, 2006

(54) SYSTEM, METHOD AND RECORD MEDIUM FOR AUDIO-VIDEO SYNCHRONOUS PLAYBACK

(75) Inventor: Mitsumasa Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 1292 days.

(21) Appl. No.: 09/620,970

(22) Filed: Jul. 20, 2000

(30) Foreign Application Priority Data

Jul. 22, 1999 (JP) .......................................... 11-207802

(51) Int. Cl.
 *H04N 9/475* (2006.01)
 *H04N 7/04* (2006.01)
 *H04N 7/06* (2006.01)
 *H04N 7/08* (2006.01)
 *H04N 7/52* (2006.01)
 *H04N 5/781* (2006.01)
 *H04N 5/85* (2006.01)
 *H04N 5/90* (2006.01)
 *H04N 5/91* (2006.01)

(52) U.S. Cl. ........................... 386/96; 386/125; 348/512

(58) Field of Classification Search ................... 386/33, 386/39, 96, 98, 125, 126; 348/423.1, 512, 348/513, 515; 704/501, 504; 700/94; 381/22
See application file for complete search history.

(56) References Cited

U.S. PATENT DOCUMENTS

| | | | | |
|---|---|---|---|---|
| 5,583,652 A | * | 12/1996 | Ware | ........................... 386/75 |
| 5,596,420 A | | 1/1997 | Daum | |
| 5,598,352 A | * | 1/1997 | Rosenau et al. | .......... 715/500.1 |
| 6,043,851 A | | 3/2000 | Sawada et al. | .............. 348/512 |
| 6,130,987 A | * | 10/2000 | Tanaka | ........................ 386/96 |
| 6,148,135 A | * | 11/2000 | Suzuki | ........................ 386/12 |
| 6,163,647 A | | 12/2000 | Terashima et al. | |
| 6,339,760 B1 | * | 1/2002 | Koda et al. | .................. 704/278 |
| 6,694,030 B1 | * | 2/2004 | Van Steenbrugge | ........ 381/94.5 |

FOREIGN PATENT DOCUMENTS

| | | |
|---|---|---|
| EP | 0 840 528 A | 5/1998 |
| JP | 10-136308 | 5/1998 |
| JP | 10-164508 | 6/1998 |
| JP | 10-200860 | 7/1998 |

* cited by examiner

*Primary Examiner*—Robert Chevalier
(74) *Attorney, Agent, or Firm*—Foley & Lardner LLP (57) ABSTRACT

In an audio-video synchronous playback control system which outputs coded audio data to an external audio decoding device so as to be decoded and played back by the external audio decoding device while playing back video data maintaining synchronization with the audio data playback of the external audio decoding device, an audio information analysis section figures out the size of one unit of the coded audio data and the size of audio data which is obtained by decoding the one unit of the coded audio data. A silent data generation section generates silent data of a size corresponding to the size of audio data. The video data playback of the video decoding/output section is controlled based on the amount of the silent data which are played back or processed by the audio output section.

29 Claims, 5 Drawing Sheets

SYSTEM, METHOD AND RECORD MEDIUM FOR AUDIO-VIDEO SYNCHRONOUS PLAYBACK

BACKGROUND OF THE INVENTION

The present invention relates to an audio-video synchronous playback control system and an audio-video synchronous playback control method for decoding and playing back audio data and video data maintaining synchronization between the audio data playback and the video data playback, and in particular, to an audio-video synchronous playback control system which outputs coded audio data to an external audio decoding device of an external audio output device so that the coded audio data will be decoded and played back by the external audio decoding device while playing back video data maintaining synchronization between the audio data playback and the video data playback, and an audio-video synchronous playback control method for the audio-video synchronous playback control system.

DESCRIPTION OF THE PRIOR ART

In order to playback MPEG (Motion Picture Experts Group) data on a personal computer, the MPEG coded data has to be decoded into audio data and video data, and synchronization between the audio data and the video data has to be maintained. Today, the decoding of the MPEG coded data and the synchronization control between audio data playback and video data playback can be implemented by software only. In some conventional audio-video synchronous playback control methods, the progress of the video playback is judged and controlled by use of playback time of the audio data and thereby the audio-video synchronous playback is attained, as proposed in Japanese Patent Application Laid-Open Nos.HEI10-164508, HEI10-200860 and HEI10-136308.

There has also been proposed a synchronous playback method in which the progress of the video data playback is judged and controlled by use of time information which is outputted by a personal computer. Such a synchronous playback method is effective when there is no audio output device and the video data playback only is executed. Therefore, the time information to be used for the synchronous playback control (playback timing control) can be selected from various ways.

These days, such software for implementing the audio-video synchronous playback control system has an increasing tendency to be developed and manufactured in units of modules (a data read section, a decoding section, an output section, etc.) by two or more makers. In such an audio-video synchronous playback control system, a "playback time" is figured out based on "data output information" which is generated by the output section (the last stage of the audio-video synchronous playback control system), and the synchronous playback control is realized by feeding back the "playback time" to each module of the system.

Figure 1:
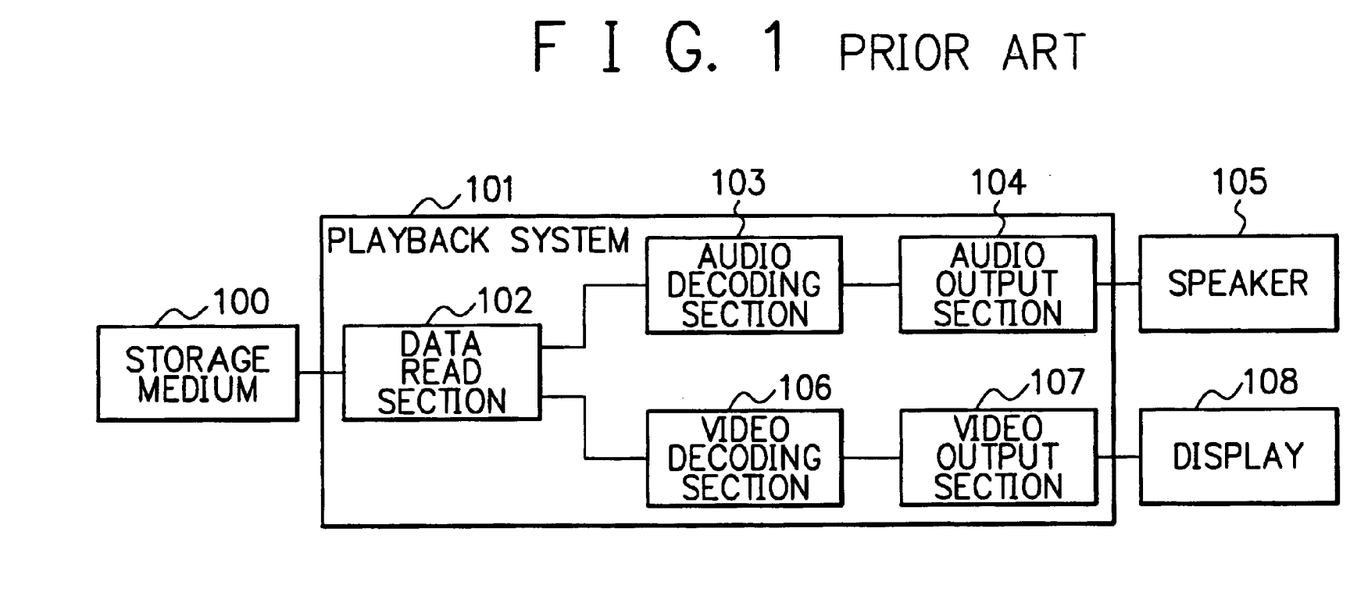
FIG. 1 is a block diagram showing a first example of a conventional audio-video synchronous playback control system.

FIG. 1 is a block diagram showing a first example of a conventional audio-video synchronous playback control system. The conventional audio-video synchronous playback control system of FIG. 1 includes a playback system 101, a speaker 105 and a display 108. The playback system 101 includes a data read section 102, an audio decoding section 103, an audio output section 104, a video decoding section 106 and a video output section 107. Coded data (coded audio data+coded video data) which have been stored in a storage medium 100 (DVD-ROM, CD-ROM (Video CD), HDD, etc.) are read out by the data read section 102, and the coded audio data and the coded video data are supplied to the audio decoding section 103 and the video decoding section 106 respectively. The audio decoding section 103 decodes the coded audio data and outputs the decoded audio data to the audio output section 104. The audio output section 104 generates an audio signal corresponding to the audio data supplied from the audio decoding section 103, and supplies the audio signal to the speaker 105 to be played back. Meanwhile, the video decoding section 106 decodes the coded video data and outputs the decoded video data to the video output section 107. The video output section 107 generates a video signal corresponding to the video data supplied from the video decoding section 106, and supplies the video signal to the display 108 to be played back.

In order to maintain the synchronization between the audio data and the video data, a "playback time" is calculated based on the amount of the audio data which have been outputted from the audio decoding section 103 to the audio output section 104, and the "playback time" is fed back to the video decoding section 106. The video decoding section 106 judges the progress of the video playback based on the "playback time" and executes the so-called "frame drop synchronization control" based on the judgment, thereby the audio-video synchronous playback control is realized.

However, in such a audio-video synchronous playback control system, the type of data to be handled by each module has to be predetermined since data processing by each of the modules and data transfer between the modules have to be ensured. If a different type of data has to be supplied to a module, the data has to be converted to the predetermined type for the module.

For example, in the case of an audio-video synchronous playback control system including an audio output section 104 which can handle PCM data of one or two channels only, if multi-channel coded audio data is supplied to the audio-video synchronous playback control system, the multi-channel coded audio data has to be mixed down into two channels and the coded audio data have to be decoded into PCM data so as to be inputted to the audio output section 104. However, the original high sound quality of the multi-channel coded audio data (Dolby AC-3 5.1ch data, for example) is necessitated to be deteriorated due to the mixdown (into 2 channels, for example), and the load on the playback system is increased due to the decoding process.

Figure 2:
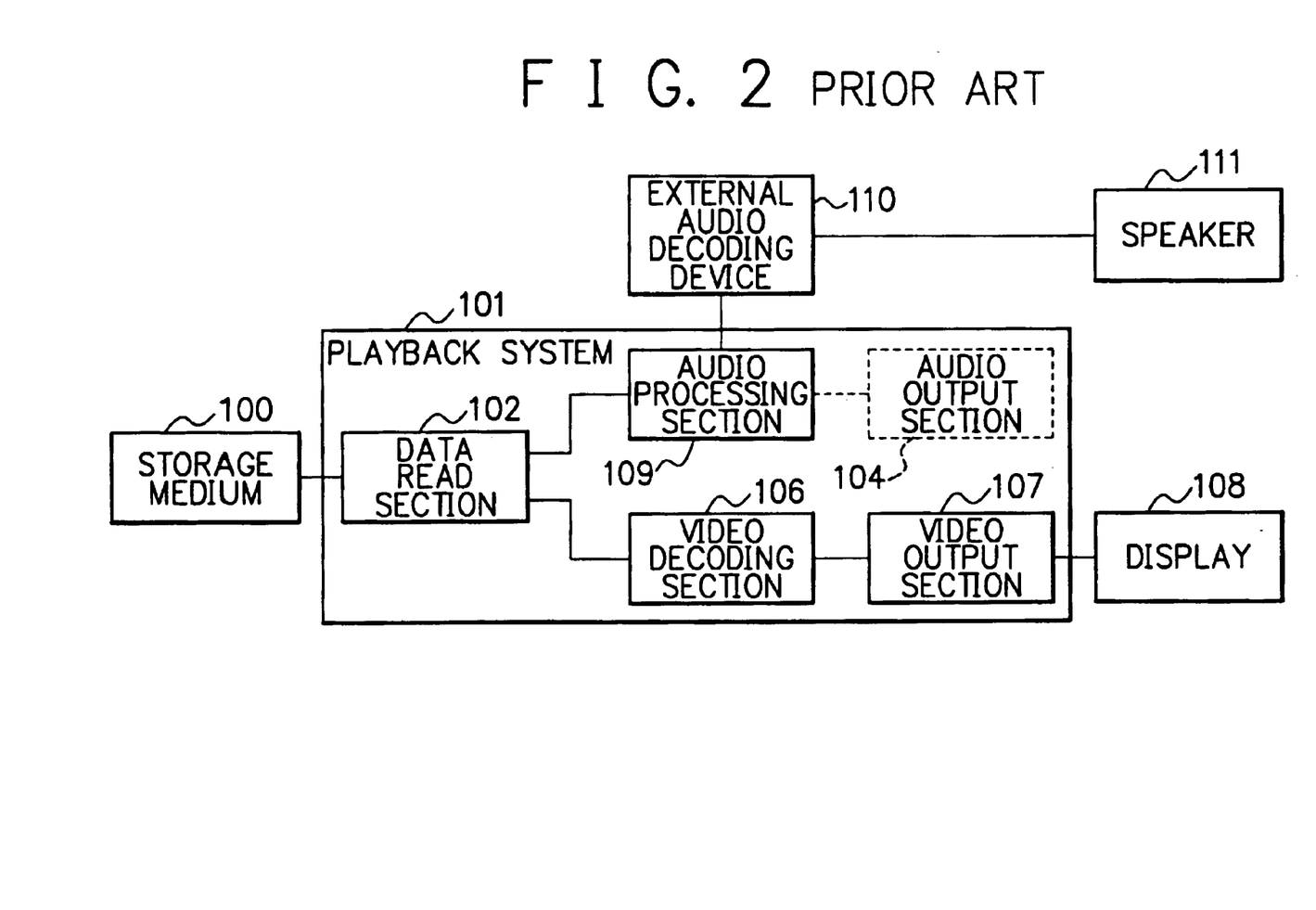
FIG. 2 is a block diagram showing a second example of a conventional audio-video synchronous playback control system.

In order to resolve the above problems, in a second conventional audio-video synchronous playback control system which is shown in FIG. 2, the multi-channel coded audio data which is supplied to the playback system 101 is outputted to an external audio decoding device 110, and the external audio decoding device 110 executes decoding of the multichannel coded audio data and outputs the decoded audio data in multiple channels.

However, in the above case where the coded audio data is outputted to the external audio decoding device 110, the coded audio data is not supplied to the audio output section 104 of the playback system 101, and thus the playback system 101 can not obtain the playback time information necessary for the audio-video synchronous playback control. Even if time information outputted by the personal computer (on which the playback system 101 is operating) is used for the audio-video synchronous playback control since the playback system 101 can not obtain the playback time information from the audio output section 104, difference of playback time (or playback speed) can occur between the playback system 101 (operating on the personal computer) and the external audio decoding device 110 due to slight difference of clock frequency etc., and thus the audio-video synchronous playback control can not be executed precisely.

SUMMARY OF THE INVENTION

It is therefore the primary object of the present invention to provide an audio-video synchronous playback control system and an audio-video synchronous playback control method, by which the synchronization between the audio data playback and the video data playback can be maintained precisely even in the case where the coded audio data is outputted to an external audio decoding device so as to be decoded and played back by the external audio decoding device.

In accordance with a first aspect of the present invention, there is provided an audio-video synchronous playback control system which outputs coded audio data to an external audio decoding device of an external audio output device so that the coded audio data will be decoded and played back by the external audio decoding device, while playing back video data maintaining synchronization between the audio data playback and the video data playback, comprising an audio processing means, an internal audio output means, a video data playback means and an audio-video synchronous playback control means. The audio processing means generates silent data of a size corresponding to the size of audio data which is obtained by decoding the coded audio data outputted to the external audio decoding device. The internal audio output means plays back or processes the silent data which are generated by the audio processing means. The video data playback means plays back the video data. The audio-video synchronous playback control means controls the video data playback of the video data playback means maintaining the synchronization with the audio data playback of the external audio decoding device based on the amount of the silent data which are played back or processed by the internal audio output means.

In accordance with a second aspect of the present invention, in the first aspect, the audio processing means includes a synchronous playback time calculation means for calculating a synchronous playback time, which means playback time of the silent data, based on the amount of the silent data which are played back or processed by the internal audio output means. The audio-video synchronous playback control means controls the video data playback of the video data playback means maintaining the synchronization with the audio data playback of the external audio decoding device, based on the synchronous playback time which is calculated by the synchronous playback time calculation means.

In accordance with a third aspect of the present invention, in the second aspect, the audio-video synchronous playback control means calculates a reference frame number, which means the number of frames which should have been played back by the video data playback means, based on the synchronous playback time calculated by the synchronous playback time calculation means, compares the number of frames which have been actually played back by the video data playback means with the reference frame number, and adjusts the progress of the video data playback of the video data playback means if there is a difference between the number of the actually-played-back frames and the reference frame number.

In accordance with a fourth aspect of the present invention, in the third aspect, the audio-video synchronous playback control means judges that the video data playback of the video data playback means is behind the audio data playback of the external audio decoding device and thus executes the frame drop operation if the number of the actually-played-back frames is smaller than the reference frame number. On the other hand, if the number of the actually-played-back frames is larger than the reference frame number, the audio-video synchronous playback control means judges that the video data playback is ahead of the audio data playback and thus suspends the operation of the video data playback means.

In accordance with a fifth aspect of the present invention, in the first aspect, the audio processing means which generates the silent data includes an audio information analysis means and a silent data generation means. The audio information analysis means figures out the size of one unit of the coded audio data and the size of audio data which is obtained by decoding the one unit of the coded audio data. The silent data generation means calculates the size of the audio data which is obtained by decoding the coded audio data outputted to the external audio decoding device by use of the sizes figured out by the audio information analysis means and generates the silent data of the calculated size.

In accordance with a sixth aspect of the present invention, in the second aspect, the audio-video synchronous playback control means is supplied with information concerning the amount of the coded audio data which are played back by the external audio decoding device of the external audio output device. The audio-video synchronous playback control means obtains a processed coded audio data total amount, which means the total amount of the coded audio data which have been played back by the external audio decoding device, based on the information supplied from the external audio decoding device, and calculates an external playback time, which means logical playback time of the coded audio data which have been played back by the external audio decoding device, based on the processed coded audio data total amount. Meanwhile, the audio-video synchronous playback control means calculates an internal playback time, which means logical playback time of the silent data which have been played back or processed by the internal audio output means, based on the total amount of the silent data which have been played back or processed by the internal audio output means. Subsequently, the audio-video synchronous playback control means compares the external playback time with the internal playback time, and adjusts the synchronization between the audio data playback of the external audio decoding device and the video data playback of the video data playback means if there is a time difference between the external playback time and the internal playback time.

In accordance with a seventh aspect of the present invention, in the sixth aspect, if there is a time difference between the external playback time and the internal playback time, the audio-video synchronous playback control means executes the adjustment of the synchronization between the audio data playback of the external audio decoding device and the video data playback of the video data playback means by adding or subtracting the time difference to/from the synchronous playback time which is calculated by the synchronous playback time calculation means.

In accordance with an eighth aspect of the present invention, in the sixth aspect, if there is a time difference between the external playback time and the internal playback time, the audio-video synchronous playback control means executes the adjustment of the synchronization between the audio data playback of the external audio decoding device and the video data playback of the video data playback means by outputting dummy coded audio data of a size corresponding to the time difference to the external audio decoding device or decreasing the amount of the coded audio data which are sent to the external audio decoding device corresponding to the time difference.

In accordance with a ninth aspect of the present invention, in the sixth aspect, if there is a time difference between the external playback time and the internal playback time, the audio-video synchronous playback control means executes the adjustment of the synchronization between the audio data playback of the external audio decoding device and the video data playback of the video data playback means by adding or subtracting silent data of a size corresponding to the time difference to/from the silent data which are generated by the audio processing means.

In accordance with a tenth aspect of the present invention, in the first aspect, the audio-video synchronous playback control system further comprises an internal audio decoding means for decoding the coded audio data and thereby generating audio data when the operation mode of the audio-video synchronous playback control system is internal audio playback mode. In the internal audio playback mode, the internal audio output means plays back the audio data generated by the internal audio decoding means, and the audio-video synchronous playback control means controls the video data playback of the video data playback means maintaining the synchronization with the audio data playback of the internal audio decoding means based on the amount of the audio data which are played back by the internal audio output means.

In accordance with an eleventh aspect of the present invention, there is provided an audio-video synchronous playback control method for an audio-video synchronous playback control system which outputs coded audio data to an external audio decoding device of an external audio output device so that the coded audio data will be decoded and played back by the external audio decoding device, while playing back video data maintaining synchronization between the audio data playback and the video data playback. The audio-video synchronous playback control method comprises a silent data generation step, an internal audio output step, a video data playback step and an audio-video synchronous playback control step. In the silent data generation step, silent data of a size corresponding to the size of audio data which is obtained by decoding the coded audio data outputted to the external audio decoding device is generated. In the internal audio output step, the silent data which are generated in the silent data generation step are played back or processed by an internal audio output means of the audio-video synchronous playback control system. In the video data playback step, the video data are played back by a video data playback means of the audio-video synchronous playback control system. In the audio-video synchronous playback control step, the video data playback of the video data playback means in the video data playback step is controlled maintaining the synchronization with the audio data playback of the external audio decoding device based on the amount of the silent data which are played back or processed by the internal audio output means in the internal audio output step.

In accordance with a twelfth aspect of the present invention, in the audio-video synchronous playback control step in the eleventh aspect, a synchronous playback time, which means playback time of the silent data, is calculated based on the amount of the silent data which are played back or processed by the internal audio output means in the internal audio output step, and the video data playback of the video data playback means in the video data playback step is controlled maintaining the synchronization with the audio data playback of the external audio decoding device, based on the synchronous playback time.

In accordance with a thirteenth aspect of the present invention, in the twelfth aspect, the audio-video synchronous playback control step includes a reference frame number calculation step, a frame number comparison step and a video data playback progress adjustment step. In the reference frame number calculation step, a reference frame number, which means the number of frames which should have been played back by the video data playback means in the video data playback step, is calculated based on the synchronous playback time. In the frame number comparison step, the number of frames which have been actually played back by the video data playback means in the video data playback step is compared with the reference frame number. In the video data playback progress adjustment step, the progress of the video data playback of the video data playback means in the video data playback step is adjusted if there is a difference between the number of the actually-played-back frames and the reference frame number.

In accordance with a fourteenth aspect of the present invention, in the video data playback progress adjustment step in the thirteenth aspect, if the number of the actually-played-back frames is smaller than the reference frame number, the video data playback of the video data playback means is judged to be behind the audio data playback of the external audio decoding device and the frame drop operation is executed. On the other hand, if the number of the actually-played-back frames is larger than the reference frame number, the video data playback is judged to be ahead of the audio data playback and the operation of the video data playback means is suspended.

In accordance with a fifteenth aspect of the present invention, in the eleventh aspect, the silent data generation step includes an audio information analysis step, an audio data size calculation step and a generation step. In the audio information analysis step, the size of one unit of the coded audio data and the size of audio data which is obtained by decoding the one unit of the coded audio data are figured out. In the audio data size calculation step, the size of the audio data which is obtained by decoding the coded audio data outputted to the external audio decoding device is calculated by use of the sizes figured out in the audio information analysis step. In the generation step, the silent data of the size calculated in the audio data size calculation step is generated.

In accordance with a sixteenth aspect of the present invention, in the twelfth aspect, the audio-video synchronous playback control step includes an information reception step, a processed coded audio data total amount calculation step, an external playback time calculation step, an internal playback time calculation step, a playback time comparison step and a synchronization adjustment step. In the information reception step, the audio-video synchronous playback control system receives information concerning the amount of the coded audio data which are played back by the external audio decoding device of the external audio output device. In the processed coded audio data total amount calculation step, a processed coded audio data total amount, which means the total amount of the coded audio data which have been played back by the external audio decoding device, is calculated based on the information received in the information reception step. In the external playback time calculation step, an external playback time, which means logical playback time of the coded audio data which have been played back by the external audio decoding device, is calculated based on the processed coded audio data total amount. In the internal playback time calculation step, an internal playback time, which means logical playback time of the silent data which have been played back or processed by the internal audio output means, is calculated based on the total amount of the silent data which have been played back or processed by the internal audio output means. In the playback time comparison step, the external playback time is compared with the internal playback time. In the synchronization adjustment step, the synchronization between the audio data playback of the external audio decoding device and the video data playback of the video data playback means is adjusted if there is a time difference between the external playback time and the internal playback time in the playback time comparison step.

In accordance with a seventeenth aspect of the present invention, in the synchronization adjustment step in the sixteenth aspect, the adjustment of the synchronization between the audio data playback of the external audio decoding device and the video data playback of the video data playback means is executed by adding or subtracting the time difference to/from the synchronous playback time.

In accordance with an eighteenth aspect of the present invention, in the synchronization adjustment step in the sixteenth aspect, the adjustment of the synchronization between the audio data playback of the external audio decoding device and the video data playback of the video data playback means is executed by outputting dummy coded audio data of a size corresponding to the time difference to the external audio decoding device or decreasing the amount of the coded audio data which are sent to the external audio decoding device corresponding to the time difference.

In accordance with a nineteenth aspect of the present invention, in the synchronization adjustment step in the sixteenth aspect, the adjustment of the synchronization between the audio data playback of the external audio decoding device and the video data playback of the video data playback means is executed by adding or subtracting silent data of a size corresponding to the time difference to/from the silent data which are generated in the silent data generation step.

In accordance with twentieth through twenty-eighth aspects of the present invention, there are provided machine-readable record mediums storing programs for instructing an audio-video synchronous playback control system, which is implemented by a computer, MPU (MicroProcessor Unit), DSP (Digital Signal Processor), etc. and which outputs coded audio data to an external audio decoding device of an external audio output device so that the coded audio data will be decoded and played back by the external audio decoding device while playing back video data maintaining synchronization between the audio data playback and the video data playback, to execute the audio-video synchronous playback control methods of the eleventh through nineteenth aspects of the present invention.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Referring now to the drawings, a description will be given in detail of preferred embodiments in accordance with the present invention.

Figure 3:
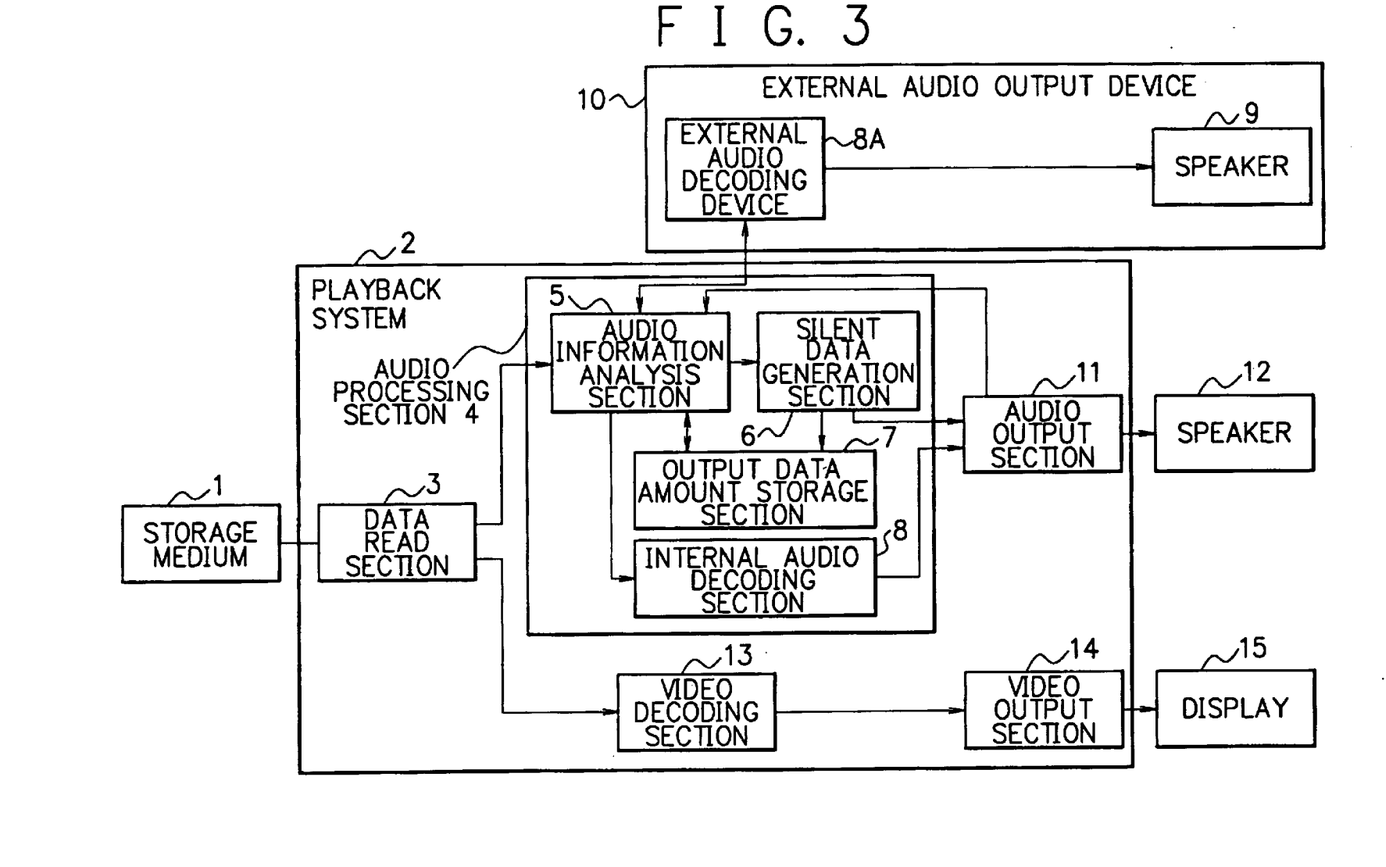
FIG. 3 is a block diagram showing an audio-video synchronous playback control system in accordance with a first embodiment of the present invention.

FIG. 3 is a block diagram showing an audio-video synchronous playback control system in accordance with a first embodiment of the present invention. The audio-video synchronous playback control system shown in FIG. 3 includes a playback system 2 which executes data processing, synchronization control etc. for implementing the audio-video synchronous playback. To the playback system 2, an external audio output device 10, a speaker 12 and a display 15 are connected. In a storage medium 1 (DVD-ROM, CD-ROM (Video CD), HDD, etc.), coded audio data and coded video data, to be decoded and played back by the audio-video synchronous playback control system, have been stored.

The external audio output device 10, which is externally connected to the playback system 2, includes an external audio decoding device 8A and a speaker 9. The external audio decoding device 8A decodes coded audio data which are supplied from the playback system 2 and thereby outputs an audio signal. The speaker 9 plays back the audio signal which is supplied from the external audio decoding device 8A.

The speaker 12 which is connected to the playback system 2 plays back a silent signal which is generated and outputted by the playback system 2, and the display 15 displays video images according to a video signal which is generated and outputted by the playback system 2.

The playback system 2 includes a data read section 3, an audio processing section 4, an audio output section 11, a video decoding section 13 and a video output section 14. The audio processing section 4 includes an audio information analysis section 5, a silent data generation section 6, an output data amount storage section 7 and an internal audio decoding section 8. The components of the playback system 2 are implemented by, for example, one or more microprocessor units which are composed of one or more CPUs (Central Processing Units), ROM (Read Only Memory), RAM (Random Access Memory), etc. It is also possible to implement the components by software which operates on a personal computer etc. Such software (computer-readable program) for realizing the functions of the components of the playback system 2 is stored in one or more record mediums.

The data read section 3 reads out data (the coded audio data and the coded video data) from the storage medium 1, and sends the coded audio data and the coded video data to the audio processing section 4 (audio information analysis section 5) and the video decoding section 13, respectively.

The audio information analysis section 5 which received the coded audio data from the data read section 3 sends out the coded audio data to the external audio decoding device 8A of the external audio output device 10, while analyzing the coded audio data and thereby figuring out information concerning the coded audio data and decoded audio data which are obtained by decoding the coded audio data. The audio information analysis section 5 also figures out playback time of "silent data" which are generated by the silent data generation section 6 and played back by the audio output section 11 ("synchronous playback time"), based on the amount of the silent data which are processed (played back) by the audio output section 11. The synchronous playback time calculated by the audio information analysis section 5 is used for realizing the audio-video synchronous playback of the external audio decoding device 8A and the video decoding section 13. The details of the processes executed by the audio information analysis section 5 will be described later concretely.

The silent data generation section 6 generates the silent data. The "silent data" means digital data ("00000 . . . 0" for example) corresponding to no sound, to be played back by the audio output section 11 silently. The silent data generation section 6 figures out the size of the silent data based on the amount of the coded audio data which are outputted from the audio information analysis section 5 to the external audio decoding device 8A and by use of the aforementioned information concerning the coded audio data and decoded audio data which is figured out by the audio information analysis section 5, and outputs the silent data of the size to the audio output section 11.

The output data amount storage section 7 stores information concerning the total amount of the coded audio data which have been outputted by the audio information analysis section 5 to the external audio decoding device 8A and information concerning the total amount of the silent data which have been processed (played back) by the audio output section 11. The information is read out and used by the audio information analysis section 5.

The audio output section 11 receives the silent data from the silent data generation section 6 and plays back the silent data, that is, outputs the silent signal corresponding to the silent data to the speaker 12 to be played back silently.

The video decoding section 13 decodes the coded video data which are supplied from the data read section 3 and outputs the decoded video data to the video output section 14. In the video data decoding process, the video decoding section 13 executes "frame drop synchronization control" by judging the progress of the video data playback in comparison with the audio data playback, using the playback time of the silent data (synchronous playback time) which has been calculated by the audio information analysis section 5.

The video output section 14 receives the decoded video data from the video decoding section 13 and plays back the video data, that is, outputs the video signal corresponding to the video data to the display 15 to be played back.

The external audio decoding device 8A of the external audio output device 10, which is supplied with the coded audio data from the audio information analysis section 5 of the playback system 2, decodes the coded audio data and outputs the decoded audio data to the speaker 9 to be played back. While the speaker 9 of the external audio output device 10 is depicted in FIG. 3 as a digital speaker for directly playing back the digital audio data supplied from the external audio decoding device 8A, it is of course possible to employ an analog speaker in the external audio output device 10 along with an audio output section which is similar to the audio output section 11 of the playback system 2.

Incidentally, the operations of the parts of the audio-video synchronous playback control system which has been explained above are the operations when the operation mode of the playback system 2 is set to "external audio playback mode". In the external audio playback mode, the audio data playback is executed by the external audio decoding device 8A of the external audio output device 10, and the audio output section 11 plays back the silent data which are generated by the silent data generation section 6. The operation mode of the playback system 2 can be switched between the external audio playback mode and "internal audio playback mode" based on a status of a selection switch of the playback system 2 which is operated by the user, whether or not an external audio output device 10 is connected to an auxiliary connector of the playback system 2, etc.

The internal audio decoding section 8 is provided to the playback system 2 for executing audio data playback when the operation mode of the playback system 2 is the internal audio playback mode. In the internal audio playback mode, the audio information analysis section 5 receives the coded audio data from the data read section 3 and supplies the coded audio data to the internal audio decoding section 8 (not to the external audio decoding device 8A). The internal audio decoding section 8 decodes the coded audio data and sends the decoded audio data to the audio output section 11. The audio output section 11 which received the decoded audio data plays back the audio data, that is, outputs an audio signal corresponding to the audio data to the speaker 12 to be played back.

In the following, a concrete example of the operations of the components of the audio-video synchronous playback control system of FIG. 3 will be described in detail. Incidentally, the explanation will be given mainly on the case where the operation mode of the playback system 2 is the external audio playback mode. The audio-video synchronous playback control in the case where operation mode of the playback system 2 is the internal audio playback mode will be explained later briefly.

The following explanation will be given on the assumption that the coded audio data is MPEG audio data (according to MPEG1 Audio layer 2) whose channel number (that is, the number of channels) is 2, sampling frequency is 48000 Hz, bit rate is 192000 bit/second, and sample number (that is, the number of samples in an AAU (Audio Access Unit)) is 1152.

The audio information analysis section 5 of the audio processing section 4 of the playback system 2 figures out the size of one unit (AAU (Audio Access Unit)) of the coded audio data (MPEG audio data) based on the coded audio data (MPEG audio data) which is read out from the storage medium 1 by the data read section 3, as follows:

AAU size $$={\{(\text{sample number}/\text{sampling frequency})\times \text{bit rate}\}}/{8}$$

$$=\{(1152/48000)\times 192000\}/8$$

$$=576 \text{ bytes} \qquad (1)$$

where the devisor "8" means that 1 byte=8 bits.

The audio information analysis section 5 figures out next the size of PCM data which is obtained by decoding the AAU (hereafter referred to as "unit PCM data size"), as follows:

unit PCM data size $$=\text{sample number} \times \text{channel number} \times 2$$

$$=1152 \times 2 \times 2$$

$$=4608 \text{ bytes} \quad (2)$$

where the multiplier factor "2" means that 1 sample=2 bytes. The audio information analysis section 5 analyzes the information concerning the coded audio data (MPEG audio data) and the decoded audio data (PCM data) as above.

The silent data generation section 6 calculates the size of the silent data to be generated, based on the size of the coded audio data (MPEG audio data) which are outputted by the audio information analysis section 5 to the external audio decoding device 8A and the above information concerning the coded audio data and the decoded audio data. The size of the generated silent data is set so as to be the same as the size of (decoded) audio data (PCM data) which are obtained by decoding the coded audio data (MPEG audio data).

For example, when the size of the coded audio data (MPEG audio data) which are outputted by the audio information analysis section 5 to the external audio decoding device 8A is 1024 bytes, the silent data generation section 6 calculates the size of the generated silent data according to the following equation (3):

silent data size $$=(\text{unit PCM data size} \times \text{coded audio data size})/\text{AAU size}$$

$$=(4608 \times 1024)/576$$

$$=8192 \text{ bytes} \quad (3)$$

The audio information analysis section 5 also figures out playback time of the audio data (more accurately, playback time of the silent data) (hereafter referred to as "synchronous playback time") by use of the amount of the silent data which have been processed (played back) by the audio output section 11, according to the following equation (4) (when the amount of the silent data which have been processed by the audio output section 11 is 920000 bytes, for example):

synchronous playback time $$=(\text{silent data amount/bit rate}) \times 8$$

$$=(920000/192000) \times 8$$

$$=38.3 \text{ seconds} \quad (4)$$

The video decoding section 13 grasps and judges the progress of its video playback process in comparison with the audio playback based on the synchronous playback time which is obtained as above, and thereby executes the frame drop synchronization control. For example, when the frame rate (as information concerning the coded video data) is 29.97 fps, the video decoding section 13 calculates the number of frames which should have been played back (hereafter referred to as "reference frame number"), according to the following equation (5):

reference frame number $$=\text{frame rate} \times \text{synchronous playback time}$$

$$=29.97 \times 38.3$$

$$=1147.851 \text{ frames} \quad (5)$$

When the number of frames which have been actually played back is smaller than the reference frame number, the video decoding section 13 judges that the video data playback is behind the audio data playback, and thus executes the frame drop operation. On the other hand, when the number of the actually-played-back frames is larger than the reference frame number, the video decoding section 13 judges that the video data playback is ahead of the audio data playback, and thus suspends its video decoding process (holds the current frame). The audio-video synchronous playback control in the case where the operation mode of the playback system 2 is the external audio playback mode is realized as above.

In the case where the operation mode of the playback system 2 is the internal audio playback mode, the audio information analysis section 5 supplies the coded audio data to the internal audio decoding section 8 (not to the external audio decoding device 8A), and the decoding of the coded audio data is executed by the internal audio decoding section 8. The audio data decoded by the internal audio decoding section 8 are supplied to the audio output section 11 and the audio output section 11 processes (plays back) the audio data, that is, outputs an audio signal corresponding to the audio data to the speaker 12 to be played back. For the audio-video synchronous playback control in the internal audio playback mode, the audio information analysis section 5 calculates the synchronous playback time based on the amount of the audio data which have been processed (played back) by the audio output section 11, according to the following equation (4A) (when the amount of the audio data which have been processed by the audio output section 11 is 920000 bytes, for example):

synchronous playback time $$=(\text{audio data amount/bit rate}) \times 8$$

$$=(920000/192000) \times 8$$

$$=38.3 \text{ seconds} \quad (4A)$$

The video decoding section 13 executes the frame drop synchronization control also in the internal audio playback mode. The video decoding section 13 first obtains the reference frame number (that is, the number of frames which should have been played back) according to the aforementioned equation (5) (using the synchronous playback time obtained from the equation (4A)), and executes the frame drop synchronization control similarly to the case of the external audio playback mode.

Figure 4:
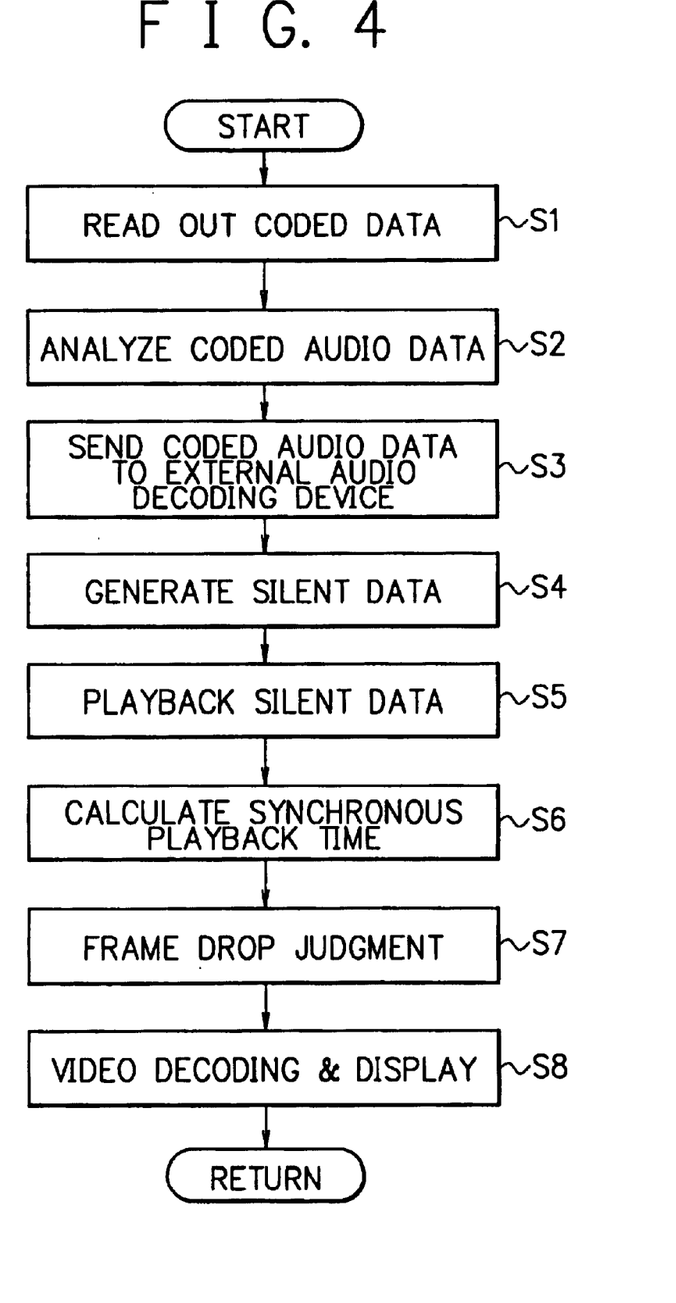
FIG. 4 is a flow chart showing an example of the operation of a playback system which is shown in FIG. 1 when the operation mode of the playback system is "external audio playback mode"

In the following, an example of a procedure which is executed by the audio-video synchronous playback control system of FIG. 3 in the case where the operation mode of the playback system 2 is the external audio playback mode will be explained referring to FIG. 4. FIG. 4 is a flow chart showing an example of the operation of the playback system 2 in the external audio playback mode.

In step S1, the data read section 3 reads out coded data from the storage medium 1, and sends the coded data to the audio processing section 4 if the coded data is coded audio data, and to the video decoding section 13 if the coded data is coded video data.

In step S2, the audio information analysis section 5 of the audio processing section 4 analyzes the coded audio data and thereby calculates the size of one unit of the coded audio data (AAU size) and the size of decoded audio data which is obtained by decoding the coded audio data of the AAU size. In the case of the concrete example which has been described above, the audio information analysis section 5 calculates the size of one unit of the MPEG audio data (AAU size) and the size of PCM data which is obtained by decoding the AAU (unit PCM data size).

In step S3, the audio information analysis section 5 sends the coded audio data to the external audio decoding device 8A of the external audio output device 10, since the operation mode of the playback system 2 is the external audio playback mode. The external audio decoding device 8A decodes the coded audio data and outputs the decoded audio data to the speaker 9 to be played back. While sending the coded audio data to the external audio decoding device 8A, the audio information analysis section 5 successively stores information concerning the coded audio data total amount (that is, the total amount of the coded audio data which have been outputted to the external audio decoding device 8A) in the output data amount storage section 7.

In step S4, the silent data generation section 6 generates the silent data based on the coded audio data total amount which has been stored in the output data amount storage section 7 in the step S3 and the information concerning the coded audio data (AAU size) and the decoded audio data (unit PCM data size) which has been obtained in the step S2. In the case of the above concrete example, the size of the silent data is obtained by use of the equation (3).

In step S5, the silent data generation section 6 sends the generated silent data to the audio output section 11. Information concerning the total amount of the silent data which have been processed (played back) by the audio output section 11 (hereafter referred to as "silent data total amount") is stored in the output data amount storage section 7. The audio output section 11 which received the silent data outputs a silent signal corresponding to the silent data to the speaker 12 to be played back with no sound.

In step S6, the audio information analysis section 5 figures out the synchronous playback time based on the total amount of the silent data which have been processed (played back) by the audio output section 11. In the case of the above concrete example, the synchronous playback time is obtained by use of the equation (4).

In step S7, the video decoding section 13 grasps and judges the present progress of the video playback compared with that of the audio playback, based on the synchronous playback time which has been obtained in the step S6, and thereby executes the frame drop synchronization control. Concretely, the video decoding section 13 first calculates the reference frame number (that is, the number of frames which should have been played back) by use of the equation (5). When the number of frames which have been actually played back is smaller than the reference frame number, the video decoding section 13 judges that the video data playback is behind the audio data playback, and thus executes the frame drop operation. When the number of the actually-played-back frames is larger, the video decoding section 13 judges that the video data playback is ahead of the audio data playback, and thus suspends its video decoding process.

In step S8, the video decoding section 13 executes the decoding of the coded video data according to the judgment of the step S7. The decoded video data are supplied to the video output section 14 and the video output section 14 outputs the video signal corresponding to the decoded video data to the display 15 to be played back.

As described above, in the audio-video synchronous playback control system in accordance with the first embodiment of the present invention, even in the case where the coded audio data are outputted by the playback system 2 to an external audio decoding device 8A of an external audio output device 10 and decoded and played back by the external audio decoding device 8A (in the case of the external audio playback mode), the silent data of a size corresponding to the time (size) of the coded audio data outputted to the external audio decoding device 8A is generated by the silent data generation section 6, and the silent data is played back by the playback system 2 and the coded audio data is decoded and played back by the external audio output device 10. The synchronous playback time is calculated by the audio information analysis section 5 based on the total amount of the silent data which have been processed (played back) by the audio output section 11, and the frame drop synchronization control is executed by the video decoding section 13 based on the synchronous playback time. By use of the silent data and the synchronous playback time, audio playback time of the audio processing section 4 can be made the same as that of the external audio output device 10, and the video playback time of the video decoding section 13 can be made the same as the audio playback time of the audio processing section 4 (synchronous playback time). Therefore, even in the case where the audio playback is conducted by the external audio output device 10 which is externally attached to the playback system 2, the audio-video synchronous playback control can be attained correctly and precisely.

In the playback of the silent data, the audio output section 11 of the playback system 2 outputs the silent signal to the speaker 12 and thereby no sound is outputted by the speaker 12, therefore, the user hears the sound from the external audio output device 10 only, like ordinary audio data playback. In the external audio playback mode, the decoding of the coded audio data and the audio playback is executed by the (special-purpose) external audio output device 10 without deteriorating the original high sound quality of the coded audio data (without the mix-down of Dolby AC-3 5.1 ch data into 2 channels, for example), therefore, a high-quality and comfortable audio listening environment can be provided to the user.

In the following, an audio-video synchronous playback control system in accordance with a second embodiment of the present invention will be explained. The audio-video synchronous playback control system of the second embodiment is designed so as to be capable of handling cases where there is a difference of signal output frequency (playback speed) between the external audio decoding device 8A and the audio output section 11 (since the precision of the signal output frequency (playback speed) of the external audio decoding device 8A or the audio output section 11 is not high). Such a case (where the signal output frequencies of the external audio decoding device 8A and the audio output section 11 are 47.999 kHz and 48.000 kHz, for example) occurs due to inaccuracy or small difference of the clock frequency between the devices (10 and 2) etc. If the audio playback by the external audio decoding device 8A and the video playback by the video output section 14 are continued in such a situation, asynchronism between the audio playback and the video playback occurs and spreads. Therefore, the audio-video synchronous playback control system of the second embodiment is designed to avoid the asynchronism between the audio playback and the video playback even if there is a difference of the signal output frequency between the external audio decoding device 8A and the audio output section 11. In the second embodiment, the amounts of data processed by the external audio decoding device 8A and the audio output section 11 are monitored, and when there is a difference between the data amounts, the time information (synchronous playback time) for the audio-video synchronous playback is corrected.

Figure 5:
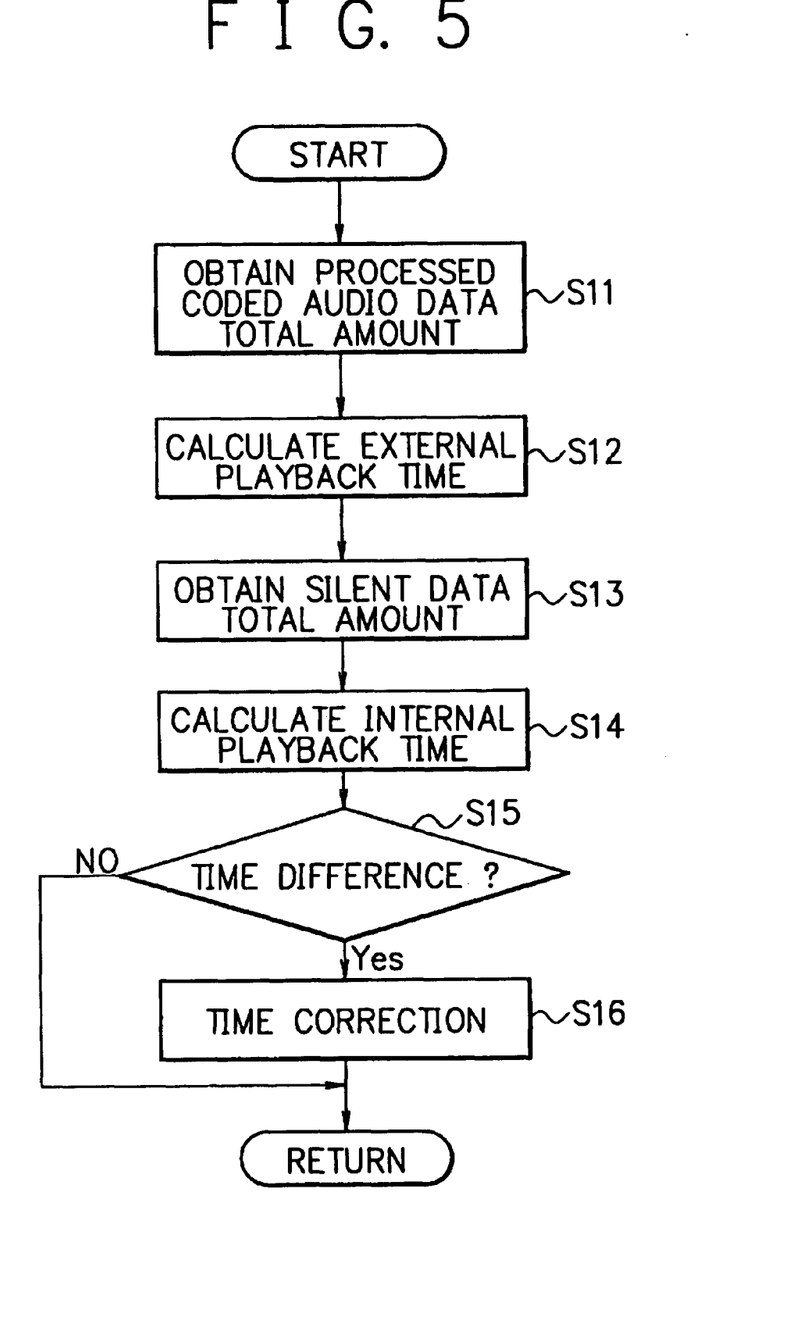
FIG. 5 is a flow chart showing an example of "time correction process" which is employed in a second embodiment of the present invention.

FIG. 5 is a flow chart showing an example of the time correction process which is employed in the second embodiment.

In the second embodiment, information concerning the amount of the coded audio data which are processed (played back) by the external audio decoding device 8A of the external audio output device 10 is supplied from the external audio decoding device 8A to the audio information analysis section 5 of the playback system 2 in the external audio playback mode. In the external audio playback mode, the audio information analysis section 5 successively obtains the total amount of the coded audio data which have been processed by the external audio decoding device 8A (hereafter referred to as "processed coded audio data total amount"), based on the information supplied from the external audio decoding device 8A (step S11). The audio information analysis section 5 calculates (logical) playback time of the coded audio data which have been played back by the external audio decoding device 8A (hereafter referred to as "external playback time") based on the processed coded audio data total amount and the information concerning the coded audio data (AAU size, for example) and the information concerning the decoded audio data (unit PCM data size, bit rate, for example) which have been analyzed and obtained (step S12).

For example, when the processed coded audio data total amount is 115200 bytes, the audio information analysis section 5 calculates the external playback time according to the following equation (6):

external playback time $$=\text{unit PCM data size} \times \text{processed coded audio data total amount}/ \text{AAU size/bit rate} \times 8$$

$$=4608 \times 115200/576/192000 \times 8$$

$$=38.4 \text{ seconds} \quad (6)$$

Meanwhile, the audio information analysis section 5 also obtains the information concerning the silent data total amount (that is, the total amount of the silent data which have been processed (played back) by the audio output section 11) from the output data amount storage section 7 (step S13), and calculates (logical) playback time of the silent data which have been processed (played back) by the audio output section 11 (hereafter referred to as "internal playback time") based on the silent data total amount and the bit rate (step S14).

For example, when the silent data total amount is 920000 bytes, the audio information analysis section 5 calculates the internal playback time according to the following equation (7) (which is similar to the equation (4)):

internal playback time $$=(\text{silent data total amount/bit rate}) \times 8$$

$$=(920000/192000) \times 8$$

$$=38.3 \text{ seconds} \quad (7)$$

Subsequently, the audio information analysis section 5 compares the internal playback time obtained in the step S14 with the external playback time obtained in the step S12 (step S15). If there is a difference between the playback times ("Yes" in the step S15), the time correction is executed by the audio information analysis section 5. In the case of the above concrete example, the internal playback time (38.3 seconds) is shorter than the external playback time (38.4 seconds) by 0.1 seconds (that is, the internal (audio-video synchronous) playback is behind the external audio playback of the external audio output device 10 by 0.1 seconds), therefore, the time correction is executed by the audio information analysis section 5 based on the time difference. Concretely, the audio information analysis section 5 adds 0.1 seconds to the synchronous playback time which is calculated next.

While the difference between the external playback time and the internal playback time was corrected by the correction of the synchronous playback time in the above example, it is also possible to execute the playback time correction by controlling the amount of the coded audio data which are outputted by the audio information analysis section 5 to the external audio decoding device 8A. Concretely, when the external playback time is longer than the internal playback time (that is, when the external audio playback is ahead of the internal audio-video synchronous playback), dummy coded audio data ("00000 . . . 0" for example for silent playback) of a size corresponding to the time difference between the external playback time and the internal playback time is sent to the external audio decoding device 8A so that the external audio playback will be delayed by the silent playback. On the other hand, when the external playback time is shorter than the internal playback time (that is, when the external audio playback is behind the internal audio-video synchronous playback), the amount of the coded audio data which are sent to the external audio decoding device 8A is decreased corresponding to the time difference. It is also possible to execute the playback time correction process by controlling the amount of the silent data which are outputted by the silent data generation section 6 to the audio output section 11.

As described above, in the audio-video synchronous playback control system in accordance with the second embodiment of the present invention, the external (audio) playback time concerning the audio playback by the external audio output device 10 is figured out by use of the total amount of the coded audio data which have been processed (played back) by the external audio decoding device 8A (processed coded audio data total amount), and the internal (synchronous) playback time concerning the audio-video synchronous playback by the playback system 2 is figured out by use of the total amount of the silent data which have been processed (played back) by the audio output section 11 (silent data total amount). The difference between the external playback time and the internal playback time is monitored and the time correction process is executed based on the difference. Therefore, in addition to the effects of the first embodiment, the audio-video synchronous playback by the external audio decoding device 8A and the audio output section 11 can be maintained precisely even in the case where there is a difference of the signal output frequency between the external audio decoding device 8A of the external audio output device 10 and the audio output section 11 of the playback system 2.

As set forth hereinabove, in the audio-video synchronous playback control system and the audio-video synchronous playback control method in accordance with the present invention, even in the case where the coded audio data are outputted by the playback system 2 to an external audio decoding device 8A of an external audio output device 10 and decoded and played back by the external audio decoding device 8A (in the case of the external audio playback mode), the silent data of a size corresponding to the time (size) of the coded audio data outputted to the external audio decoding device 8A is generated, and the video data playback of the video decoding section 13 and the video output section 14 of the playback system 2 is controlled maintaining the synchronization with the audio data playback of the external audio decoding device 8A, based on the amount of the silent data which are played back or processed by the audio output section 11 of the playback system 2. Concretely, the synchronous playback time is calculated based on the total amount of the silent data which have been played back or processed by the audio output section 11, and the frame drop synchronization control is executed based on the synchronous playback time. Therefore, even in the case where the audio playback is conducted by the external audio output device 10 which is externally attached to the playback system 2, the audio-video synchronous playback control can be attained correctly and precisely.

In the playback or processing of the silent data by the audio output section 11, no sound is outputted by the speaker 12, therefore, the user hears the sound from the external audio output device 10 only, like ordinary audio data playback. In the external audio playback mode, the decoding of the coded audio data and the audio playback is executed by the (special-purpose) external audio output device 10 without deteriorating the original high sound quality of the coded audio data (without the mix-down of Dolby AC-3 5.1ch data into 2 channels, for example), therefore, a high-quality and comfortable audio listening environment can be provided to the user.

For handling the cases where there is a difference of the signal output frequency between the external audio decoding device 8A of the external audio output device 10 and the audio output section 11 of the playback system 2, the external (audio) playback time concerning the audio playback by the external audio output device 10 is figured out by use of the total amount of the coded audio data which have been processed (played back) by the external audio decoding device 8A (processed coded audio data total amount), and the internal (synchronous) playback time concerning the audio-video synchronous playback by the playback system 2 is figured out by use of the total amount of the silent data which have been processed (played back) by the audio output section 11 (silent data total amount). The difference between the external playback time and the internal playback time is monitored, and the time correction process is executed based on the difference. Therefore, the audio-video synchronous playback by the external audio decoding device 8A and the audio output section 11 can be maintained precisely even in the case where there is a difference of the signal output frequency between the external audio output device 10 and the playback system 2.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An audio-video synchronous playback control system which outputs coded audio data to an external audio decoding device of an external audio output device so that the coded audio data will be decoded and played back by the external audio decoding device, while playing back video data maintaining synchronization between the audio data playback and the video data playback, comprising:

an audio processing means which generates silent data of a size corresponding to the size of audio data which is obtained by decoding the coded audio data outputted to the external audio decoding device;

an internal audio output means which plays back or processes the silent data which are generated by the audio processing means;

a video data playback means which plays back the video data; and an audio-video synchronous playback control means which controls the video data playback of the video data playback means maintaining the synchronization with the audio data playback of the external audio decoding device based on the amount of the silent data which are played back or processed by the internal audio output means.

2. An audio-video synchronous playback control system as claimed in claim 1, wherein:

the audio processing means includes a synchronous playback time calculation means for calculating a synchronous playback time, which means playback time of the silent data, based on the amount of the silent data which are played back or processed by the internal audio output means, and the audio-video synchronous playback control means controls the video data playback of the video data playback means maintaining the synchronization with the audio data playback of the external audio decoding device, based on the synchronous playback time which is calculated by the synchronous playback time calculation means.

3. An audio-video synchronous playback control system as claimed in claim 2, wherein:

the audio-video synchronous playback control means calculates a reference frame number, which means the number of frames which should have been played back by the video data playback means, based on the synchronous playback time calculated by the synchronous playback time calculation means, compares the number of frames which have been actually played back by the video data playback means with the reference frame number, and adjusts the progress of the video data playback of the video data playback means if there is a difference between the number of the actually-played-back frames and the reference frame number.

4. An audio-video synchronous playback control system as claimed in claim 3, wherein the audio-video synchronous playback control means judges that the video data playback of the video data playback means is behind the audio data playback of the external audio decoding device and thus executes the frame drop operation if the number of the actually-played-back frames is smaller than the reference frame number, and judges that the video data playback is ahead of the audio data playback and thus suspends the operation of the video data playback means if the number of the actually-played-back frames is larger than the reference frame number.

5. An audio-video synchronous playback control system as claimed in claim 1, wherein the audio processing means which generates the silent data includes:

an audio information analysis means which figures out the size of one unit of the coded audio data and the size of audio data which is obtained by decoding the one unit of the coded audio data; and a silent data generation means which calculates the size of the audio data which is obtained by decoding the coded audio data outputted to the external audio decoding device by use of the sizes figured out by the audio information analysis means and generates the silent data of the calculated size.

6. An audio-video synchronous playback control system as claimed in claim 2, wherein:

the audio-video synchronous playback control means is supplied with information concerning the amount of the coded audio data which are played back by the external audio decoding device of the external audio output device, obtains a processed coded audio data total amount, which means the total amount of the coded audio data which have been played back by the external audio decoding device, based on the information supplied from the external audio decoding device, calculates an external playback time, which means logical playback time of the coded audio data which have been played back by the external audio decoding device, based on the processed coded audio data total amount, calculates an internal playback time, which means logical playback time of the silent data which have been played back or processed by the internal audio output means, based on the total amount of the silent data which have been played back or processed by the internal audio output means, compares the external playback time with the internal playback time, and adjusts the synchronization between the audio data playback of the external audio decoding device and the video data playback of the video data playback means if there is a time difference between the external playback time and the internal playback time.

7. An audio-video synchronous playback control system as claimed in claim 6, wherein if there is a time difference between the external playback time and the internal playback time, the audio-video synchronous playback control means executes the adjustment of the synchronization between the audio data playback of the external audio decoding device and the video data playback of the video data playback means by adding or subtracting the time difference to/from the synchronous playback time which is calculated by the synchronous playback time calculation means.

8. An audio-video synchronous playback control system as claimed in claim 6, wherein if there is a time difference between the external playback time and the internal playback time, the audio-video synchronous playback control means executes the adjustment of the synchronization between the audio data playback of the external audio decoding device and the video data playback of the video data playback means by outputting dummy coded audio data of a size corresponding to the time difference to the external audio decoding device or decreasing the amount of the coded audio data which are sent to the external audio decoding device corresponding to the time difference.

9. An audio-video synchronous playback control system as claimed in claim 6, wherein if there is a time difference between the external playback time and the internal playback time, the audio-video synchronous playback control means executes the adjustment of the synchronization between the audio data playback of the external audio decoding device and the video data playback of the video data playback means by adding or subtracting silent data of a size corresponding to the time difference to/from the silent data which are generated by the audio processing means.

10. An audio-video synchronous playback control system as claimed in claim 1, further comprising an internal audio decoding means for decoding the coded audio data and thereby generating audio data when the operation mode of the audio-video synchronous playback control system is internal audio playback mode, wherein:

in the internal audio playback mode, the internal audio output means plays back the audio data generated by the internal audio decoding means, and the audio-video synchronous playback control means controls the video data playback of the video data playback means maintaining the synchronization with the audio data playback of the internal audio decoding means based on the amount of the audio data which are played back by the internal audio output means.

11. An audio-video synchronous playback control method for an audio-video synchronous playback control system which outputs coded audio data to an external audio decoding device of an external audio output device so that the coded audio data will be decoded and played back by the external audio decoding device, while playing back video data maintaining synchronization between the audio data playback and the video data playback, comprising the steps of:

a silent data generation step in which silent data of a size corresponding to the size of audio data which is obtained by decoding the coded audio data outputted to the external audio decoding device is generated;

an internal audio output step in which the silent data which are generated in the silent data generation step are played back or processed by an internal audio output means of the audio-video synchronous playback control system;

a video data playback step in which the video data are played back by a video data playback means of the audio-video synchronous playback control system; and an audio-video synchronous playback control step in which the video data playback of the video data playback means in the video data playback step is controlled maintaining the synchronization with the audio data playback of the external audio decoding device based on the amount of the silent data which are played back or processed by the internal audio output means in the internal audio output step.

12. An audio-video synchronous playback control method as claimed in claim 11, wherein in the audio-video synchronous playback control step:

a synchronous playback time, which means playback time of the silent data, is calculated based on the amount of the silent data which are played back or processed by the internal audio output means in the internal audio output step, and the video data playback of the video data playback means in the video data playback step is controlled maintaining the synchronization with the audio data playback of the external audio decoding device, based on the synchronous playback time.

13. An audio-video synchronous playback control method as claimed in claim 12, wherein the audio-video synchronous playback control step includes:

a reference frame number calculation step in which a reference frame number, which means the number of frames which should have been played back by the video data playback means in the video data playback step, is calculated based on the synchronous playback time;

a frame number comparison step in which the number of frames which have been actually played back by the video data playback means in the video data playback step is compared with the reference frame number; and a video data playback progress adjustment step in which the progress of the video data playback of the video data playback means in the video data playback step is adjusted if there is a difference between the number of the actually-played-back frames and the reference frame number.

14. An audio-video synchronous playback control method as claimed in claim 13, wherein in the video data playback progress adjustment step:

if the number of the actually-played-back frames is smaller than the reference frame number, the video data playback of the video data playback means is judged to be behind the audio data playback of the external audio decoding device and the frame drop operation is executed, and if the number of the actually-played-back frames is larger than the reference frame number, the video data playback is judged to be ahead of the audio data playback and the operation of the video data playback means is suspended.

15. An audio-video synchronous playback control method as claimed in claim 11, wherein the silent data generation step includes:

an audio information analysis step in which the size of one unit of the coded audio data and the size of audio data which is obtained by decoding the one unit of the coded audio data are figured out;

an audio data size calculation step in which the size of the audio data which is obtained by decoding the coded audio data outputted to the external audio decoding device is calculated by use of the sizes figured out in the audio information analysis step; and a generation step in which the silent data of the size calculated in the audio data size calculation step is generated.

16. An audio-video synchronous playback control method as claimed in claim 12, wherein the audio-video synchronous playback control step includes:

an information reception step in which the audio-video synchronous playback control system receives information concerning the amount of the coded audio data which are played back by the external audio decoding device of the external audio output device;

a processed coded audio data total amount calculation step in which a processed coded audio data total amount, which means the total amount of the coded audio data which have been played back by the external audio decoding device, is calculated based on the information received in the information reception step;

an external playback time calculation step in which an external playback time, which means logical playback time of the coded audio data which have been played back by the external audio decoding device, is calculated based on the processed coded audio data total amount;

an internal playback time calculation step in which an internal playback time, which means logical playback time of the silent data which have been played back or processed by the internal audio output means, is calculated based on the total amount of the silent data which have been played back or processed by the internal audio output means;

a playback time comparison step in which the external playback time is compared with the internal playback time; and a synchronization adjustment step in which the synchronization between the audio data playback of the external audio decoding device and the video data playback of the video data playback means is adjusted if there is a time difference between the external playback time and the internal playback time in the playback time comparison step.

17. An audio-video synchronous playback control method as claimed in claim 16, wherein in the synchronization adjustment step:

the adjustment of the synchronization between the audio data playback of the external audio decoding device and the video data playback of the video data playback means is executed by adding or subtracting the time difference to/from the synchronous playback time.

18. An audio-video synchronous playback control method as claimed in claim 16, wherein in the synchronization adjustment step:

the adjustment of the synchronization between the audio data playback of the external audio decoding device and the video data playback of the video data playback means is executed by outputting dummy coded audio data of a size corresponding to the time difference to the external audio decoding device or decreasing the amount of the coded audio data which are sent to the external audio decoding device corresponding to the time difference.

19. An audio-video synchronous playback control method as claimed in claim 16, wherein in the synchronization adjustment step:

the adjustment of the synchronization between the audio data playback of the external audio decoding device and the video data playback of the video data playback means is executed by adding or subtracting silent data of a size corresponding to the time difference to/from the silent data which are generated in the silent data generation step.

20. A machine-readable record medium storing a program for instructing an audio-video synchronous playback control system, which is implemented by a computer, MPU (MicroProcessor Unit), DSP (Digital Signal Processor), etc. and which outputs coded audio data to an external audio decoding device of an external audio output device so that the coded audio data will be decoded and played back by the external audio decoding device while playing back video data maintaining synchronization between the audio data playback and the video data playback, to execute an audio-video synchronous playback control process comprising the steps of:

a silent data generation step in which silent data of a size corresponding to the size of audio data which is obtained by decoding the coded audio data outputted to the external audio decoding device is generated;

an internal audio output step in which the silent data which are generated in the silent data generation step are played back or processed by an internal audio output means of the audio-video synchronous playback control system;

a video data playback step in which the video data are played back by a video data playback means of the audio-video synchronous playback control system; and an audio-video synchronous playback control step in which the video data playback of the video data playback means in the video data playback step is controlled maintaining the synchronization with the audio data playback of the external audio decoding device based on the amount of the silent data which are played back or processed by the internal audio output means in the internal audio output step.

21. A machine-readable record medium as claimed in claim 20, wherein in the audio-video synchronous playback control step:
   a synchronous playback time, which means playback time of the silent data, is calculated based on the amount of the silent data which are played back or processed by the internal audio output means in the internal audio output step, and
   the video data playback of the video data playback means in the video data playback step is controlled maintaining the synchronization with the audio data playback of the external audio decoding device, based on the synchronous playback time.

22. A machine-readable record medium as claimed in claim 21, wherein the audio-video synchronous playback control step includes:
   a reference frame number calculation step in which a reference frame number, which means the number of frames which should have been played back by the video data playback means in the video data playback step, is calculated based on the synchronous playback time;
   a frame number comparison step in which the number of frames which have been actually played back by the video data playback means in the video data playback step is compared with the reference frame number; and
   a video data playback progress adjustment step in which the progress of the video data playback of the video data playback means in the video data playback step is adjusted if there is a difference between the number of the actually-played-back frames and the reference frame number.

23. A machine-readable record medium as claimed in claim 22, wherein in the video data playback progress adjustment step:
   if the number of the actually-played-back frames is smaller than the reference frame number, the video data playback of the video data playback means is judged to be behind the audio data playback of the external audio decoding device and the frame drop operation is executed, and
   if the number of the actually-played-back frames is larger than the reference frame number, the video data playback is judged to be ahead of the audio data playback and the operation of the video data playback means is suspended.

24. A machine-readable record medium as claimed in claim 20, wherein the silent data generation step includes:
   an audio information analysis step in which the size of one unit of the coded audio data and the size of audio data which is obtained by decoding the one unit of the coded audio data are figured out;
   an audio data size calculation step in which the size of the audio data which is obtained by decoding the coded audio data outputted to the external audio decoding device is calculated by use of the sizes figured out in the audio information analysis step; and
   a generation step in which the silent data of the size calculated in the audio data size calculation step is generated.

25. A machine-readable record medium as claimed in claim 21, wherein the audio-video synchronous playback control step includes:
   an information reception step in which the audio-video synchronous playback control system receives information concerning the amount of the coded audio data which are played back by the external audio decoding device of the external audio output device;
   a processed coded audio data total amount calculation step in which a processed coded audio data total amount, which means the total amount of the coded audio data which have been played back by the external audio decoding device, is calculated based on the information received in the information reception step;
   an external playback time calculation step in which an external playback time, which means logical playback time of the coded audio data which have been played back by the external audio decoding device, is calculated based on the processed coded audio data total amount;
   an internal playback time calculation step in which an internal playback time, which means logical playback time of the silent data which have been played back or processed by the internal audio output means, is calculated based on the total amount of the silent data which have been played back or processed by the internal audio output means;
   a playback time comparison step in which the external playback time is compared with the internal playback time; and
   a synchronization adjustment step in which the synchronization between the audio data playback of the external audio decoding device and the video data playback of the video data playback means is adjusted if there is a time difference between the external playback time and the internal playback time in the playback time comparison step.

26. A machine-readable record medium as claimed in claim 25, wherein in the synchronization adjustment step:
   the adjustment of the synchronization between the audio data playback of the external audio decoding device and the video data playback of the video data playback means is executed by adding or subtracting the time difference to/from the synchronous playback time.

27. A machine-readable record medium as claimed in claim 25, wherein in the synchronization adjustment step:
   the adjustment of the synchronization between the audio data playback of the external audio decoding device and the video data playback of the video data playback means is executed by outputting dummy coded audio data of a size corresponding to the time difference to the external audio decoding device or decreasing the amount of the coded audio data which are sent to the external audio decoding device corresponding to the time difference.

28. A machine-readable record medium as claimed in claim 25, wherein in the synchronization adjustment step:
   the adjustment of the synchronization between the audio data playback of the external audio decoding device and the video data playback of the video data playback means is executed by adding or subtracting silent data of a size corresponding to the time difference to/from the silent data which are generated in the silent data generation step.

29. An audio-video synchronous playback control system which outputs coded audio data to an external audio decoding device of an external audio output device so that the coded audio data will be decoded and played back by the external audio decoding device, while playing back video data maintaining synchronization between the audio data playback and the video data playback, comprising:

an audio procession section which generates silent data of a size corresponding to the size of audio data which is obtained by decoding the coded audio data outputted to the external audio decoding device;

an internal audio output section which plays back or processes the silent data which are generated by the audio processing section;

an audio-video synchronous playback controller which controls the video data playback of the video data playback section maintaining the synchronization with the audio data playback of the external audio decoding device based on the amount of the silent data which are played back or processed by the internal audio output section.

* * * * *